DATA SIGNAL GENERATING APPARATUS

Filed July 31, 1967 3 Sheets-Sheet 1

INVENTOR.
JOHN GUZAK, JR.
BY Joseph J. [signature]
ATTORNEY

INVENTOR.
JOHN GUZAK, JR.
BY Joseph J. Grass
ATTORNEY

INVENTOR.
JOHN GUZAK, JR.
BY Joseph J. Grass
ATTORNEY

United States Patent Office 3,466,647
Patented Sept. 9, 1969

3,466,647
DATA SIGNAL GENERATING APPARATUS

John Guzak, Jr., Waukegan, Ill., assignor to SCM Corporation, New York, N.Y., a corporation of New York Filed July 31, 1967, Ser. No. 657,392
Int. Cl. G08c *9/08*
U.S. Cl. 340—365 17 Claims

ABSTRACT OF THE DISCLOSURE

There is disclosed apparatus for generating binary code data signals, wherein each signal is composed of a predetermined combination of data bits. A plurality of two-state eletcronic memory devices having data bit outputs are controlled from a keyboard which has signal keys, fewer in number than the maximum number of data signals capable of being provided by the memory devices, and two special keys. When a selected signal key is depressed, a predetermined combination of switches is operated to set the memory devices electrically to states corresponding to the selected signal being generated. Depression of the selected signal key together with one or the other or both special keys changes the states of certain memory devices to provide different data signals than would be provided by depression of only the selected key.

This invention relates to data signal generating apparatus and in particular to apparatus for generating data signals from a keyboard.

In the transmission of data signals, it is common practice to generate a code composed of different data signals. The generating apparatus often takes the form of a keyboard transmitter, the output signals of which can be transmitted to a receiver such as a printer, a reperforator, a storage buffer, or the like.

It is a primary object of the invention to provide an improved data signal generating apparatus which generates signals electrically, which has fewer inputs, specifically keys, than the maximum number of data signals which can be generated, and which is relatively simple and economical to construct and is reliable in operation.

It is another object of the invention to provide improved data signal generating apparatus in which keys including at least one special key of a keyboard electrically control two-state memory devices capable of providing data signals greater in number than the number of keys, in which the signal generated by operating a selected key together with the special key is different from the signal generated when only the selected key is operated, in which the memory devices are operable by improved circuitry, wherein the memory devices are sequentially settable and resettable in response to depression of a selected key and the special key.

Other objects of the invention will be apparent from the following description and the accompanying drawings, in which.

Figure 1:
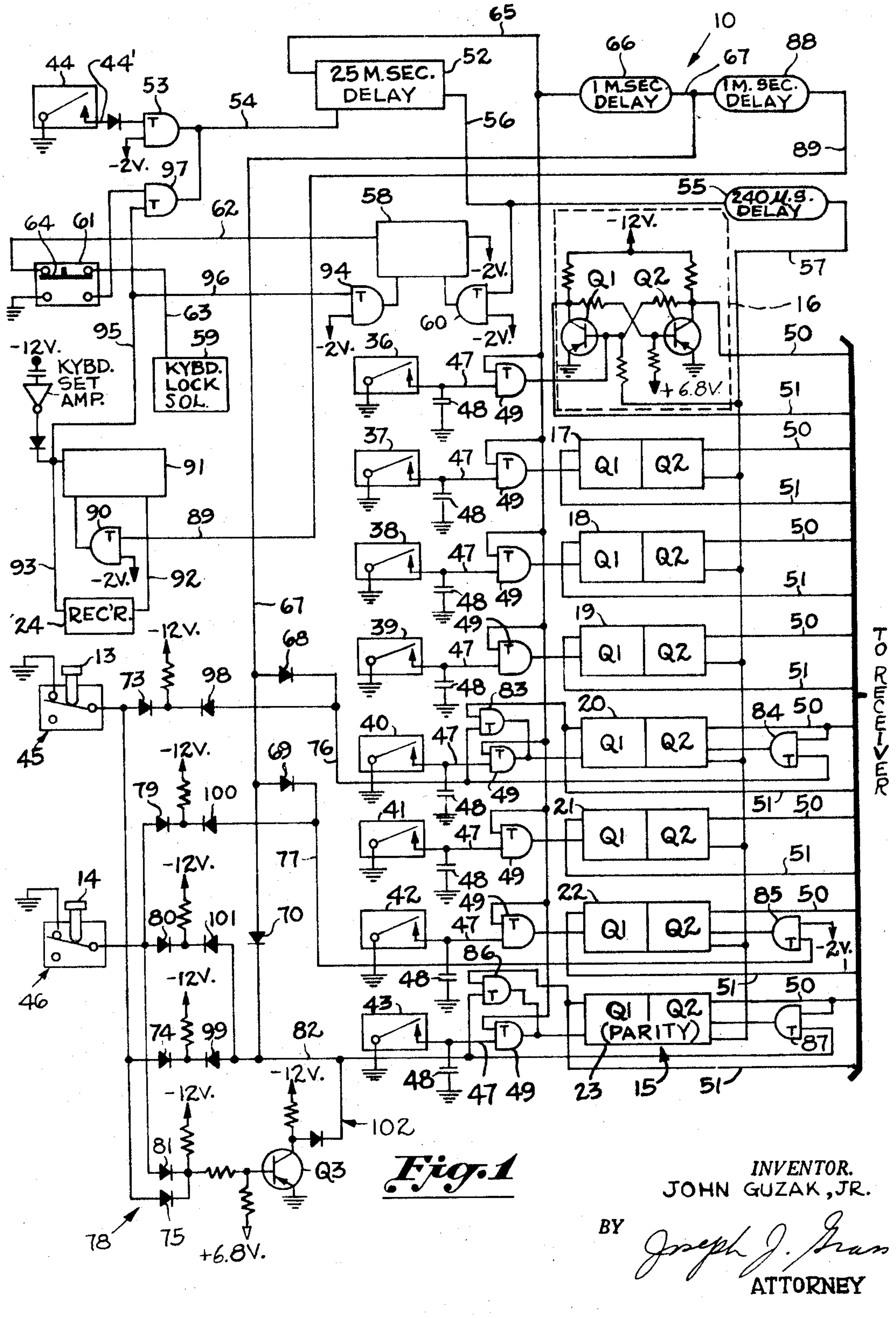
FIGURE 1 is a diagrammatic view of a data signal generating apparatus in accordance with the invention, various of the components being shown in logic form.

In general, data signal generating apparatus indicated at 10 (FIGURE 1) is shown to include a keyboard 11 (FIGURES 3, 4, and 5) having signal keys 12 and special keys 13 and 14, and a set 15 of two-state electronic memory devices 16 through 23 (FIGURE 1) controlled from the keyboard 11. The memory devices 16 through 23 can provide successive parallel output signals to a receiver 24. Each of the memory devices 16 through 23 provides a single binary data bit output. Each predetermined combination of data bits put out by the set 15 of memory devices is representative of a different signal. The state of each memory device determines the voltage level of its output.

Figures 2, 3, 4, 5:
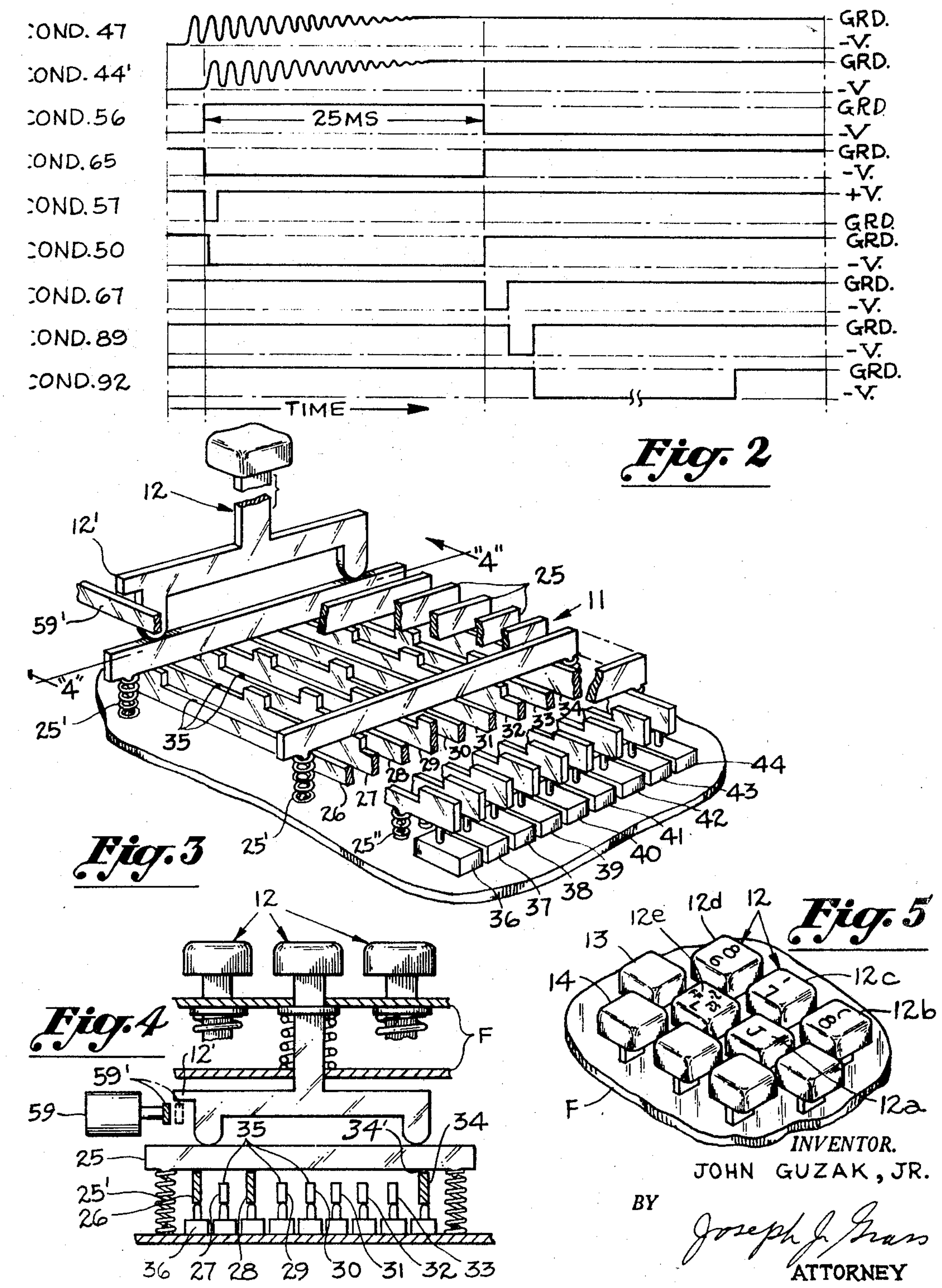
FIGURE 2 is a view showing voltage waveforms occurring at various locations in the generating apparatus.
FIGURE 3 is a fragmentary perspective view of a keyboard of the illustrated generating apparatus.
FIGURE 4 is a view taken along line 4—4 of FIGURE 3.
FIGURE 5 is a fragmentary perspective view showing the staggered arrangement of the signal keys of the keyboard and two special keys.
Figure 6:
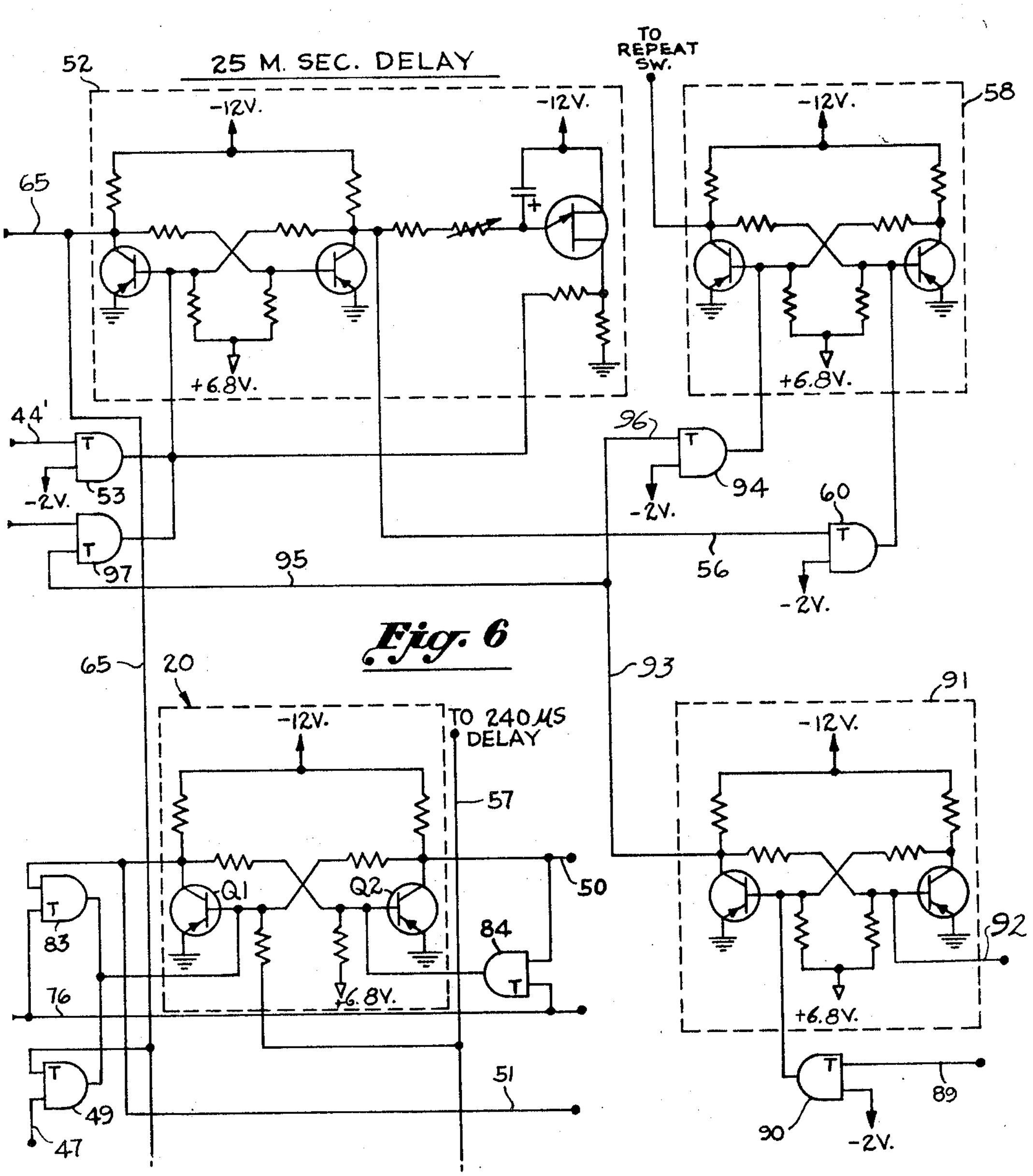
FIGURE 6 is a view showing a circuit diagram of various components shown in logic form in FIGURE 1.

Each one of the signal keys 12 is mounted for vertical movement in a keyboard frame F and operates a respective bar 25. Each bar 25 is spring urged upwardly by springs 25'. Code bars 26 through 34 underlie the bars 25 and are suspended by springs 25''. The code bars 26 through 33 have notches 35 at predetermined locations. The code bar 34 is a universal code bar and has no notch. Switches 36 through 44 are operable by respective code bars 26 through 34. When a selected signal key 12 is depressed, its respective bar 25 is depressed; as that bar 25 moves downwardly, the code bar or bars which have notches in the path of that bar 25 will not be moved downwardly, but the remaining code bar or bars will be moved downwardly. Downward movement of any one of the code bars 26 through 34 will cause closure of respective switches 36 through 44. As the code bar 34 has no notch, it will be moved downwardly each time any key 12 is depressed, thereby closing the switch 44. A small gap is provided between each bar 25 and the code bar 34, so that the switch 44 is closed shortly after the predetermined switches 36 through 43 are closed. This mechanical time delay action is illustrated in FIGURE 4 wherein the code bars 26 and 28 are in abutment with the bar 25, but the bar 25 is spaced from the universal code bar 34 by a gap 34'. When the associated key 12 is depressed, the switch 44 will close after the switches 36 and 38 close. The keys 13 and 14 operate respective switches 45 and 46 directly. Each key 12, 13, and 14 is considered to provide an input. The keyboard shown in FIGURES 3, 4, and 5 is illustrative only and depicts one mode of providing inputs.

In FIGURE 5, certain of the signal keys 12 are further indicated as keys 12*a*, 12*b*, 12*c*, 12*d*, and 12*e*. Depression of the key 12*a* will cause the symbol signal J to be generated. Depression of the key 12*b* will cause the symbol signal "8" to be generated; depression of the key 12*b* and the key 13 will cause the symbol signal "(" to be generated. Depression of the key 12*c* will cause the symbol signal "7" to be generated; depression of the key 12*c* and the key 13 will cause the symbol signal "'" to be generated. Depression of the key 12*d* will cause the symbol signal "6" to be generated; depression of the key 12*d* and the key 13 will cause the symbol signal "8" to be generated. Depression of the key 12*e* will cause the symbol signal L to be generated; depression of the key 12*e* and the key 13 will cause the symbol signal " ~ " to be generated; depression of the key 12*e* and the key 14 will cause the machine function signal FF (form feed) to be generated; and depression of the key 12*e* and the keys 13 and 14 will cause the machine function signal FS (form separator) to be generated.

With reference to FIGURE 1, the switches 36 through 43 are shown to be electrically connected to respective memory devices 16 through 23 by associated conductors 47 through pedestal gates 49. When the switches 36 through 43 are closed, the respective conductors 47 are connected directly to ground. Capacitors 48 serve to dampen the effect of the closure of respective switches 36 through 43.

The memory devices 17 through 23 are identical in construction to the memory device 16 which is shown in detail in FIGURE 1. Referring in particular to the memory device 16, it is shown to be a bistable multivibrator. The memory device 16 is triggered from one state to the opposite state by means of a respective pedestal gate 49. Output conductors 50 are connected to the one side of respective memory devices 16 through 23, specifically to the respective collectors of the transistors Q2, and output conductors 51 are connected to the opposite side of respective memory devices 16 through 23, specifically to the respective collectors of the transistors Q1. The voltage levels, that is, the data bit outputs, provided by the conductors 50 are opposite from the voltage levels provided by the conductors 51. For example, when the conductor 50 of any respective memory device 16 through 23 is at ground potential, the associated conductor 51 will be at negative potential, and vice versa.

When the switch 44 is closed, the operation of a 25 mill-second delay 52 in the form of a one-shot is initiated by a pedestal gate 53, and a pulse on a conductor 56 initiates the operation of a 240 micro-second delay 55. During the operation of the delay a negative pulse is applied to all the memory devices 16 through 23 via a conductor 57 to drive the memory devices to their initial states. Hence, all the transistors Q1 are turned on by forcing their collectors to ground potential. The pulse on the conductor 56 also operates a keyboard lock device 58 in the form of a bistable multivibrator through a pedestal gate 60, to cause a keyboard lock solenoid 59 to lock the keyboard so that no key 12 can be depressed. When the solenoid 59 is energized, a bar 59' is moved from the solid line position to the broken line position (FIGURE 4) beneath a lug 12' of each key 12. The keyboard lock device 58 is connected to a manually operable repeat switch 61 by a conductor 62, and the switch 61 is connected to the keyboard lock solenoid 59 by a conductor 63. The switch 61 has a movable contact 64 which is normally in the position shown in FIGURE 1.

At 25 milli-seconds after the delay 52 is operated, the delay 52 returns to its initial state and causes a pulse to be applied to a conductor 65 causing initiation of a time delay 66; each pedestal gate 49 of each memory device 16 through 23 associated with a switch 36 through 43 which was previously closed, is triggered by the pulse on the conductor 65. For example, if the switches 36 and 38 (in addition to the switch 44) were closed by depression of a selected signal switch 12, only the pedestal gates 49 of memory devices 16 and 18 would be triggered by a pulse in the conductor 65.

The pedestal gate or gates 49 associated with predetermined ones of the switches 36 through 43 are enabled at the end of a period of 25 milli-seconds after the operation of the delay 52 is initiated. This assures that each predetermined switch, of the set of switches 36 through 43, is completely closed before its respective memory device or devices are operated. Each pedestal gate 49 which is operated reverses the state of the respective memory device from its initial state. In the illustrated embodiment, the collector of each transistor Q1 was initially set to ground potential and the collector of each transistor Q2 was thus set to negative potential. Triggering of any or all the pedestal gates 49 will cause the collectors of the respective transistors K2 to be driven to ground potential, and the collectors of the respective transistors Q1 will be driven to negative potential.

Assume the key 12*a* is operated to thereby effect closure of the switches 37, 39, 42, and 44. The switch 44, which closes shortly after the switches 37, 39, and 42 close, will operate the delay 52 and memory devices 16 through 23 will all be set to initial states by a pulse from the delay 55. Thereafter, a pulse from the delay 52 will trigger the pedestal gates 49 associated with the switches 37, 39, and 42, thereby changing the states of respective memory devices 17, 19, and 22; the respective output conductors 50 will be at potentials indicative of the symbol signal J, corresponding to the depressed key 12*a*. Specifically, the output conductors 50 associated with the memory devices 17, 19, and 22 will be at ground potential and the output conductors 50 associated with the memory devices 16, 18, 20, 21, and 23 will remain at negative potential. Each output conductor 50 thus contains a data bit, and this combination of data bits constitutes the output signal.

Following depression of any key 12 and at the end of 1 milli-second after a pulse is applied to the delay 66 via the conductor 65, negative potential is applied to a conductor 67 which is connected to diodes 68, 69, and 70. Depression of the key 13 will disconnect diodes 73, 74, and 75 from ground potential and allow negtaive potential to be applied to conductors 76 and 82. An AND gate 78 is not enabled when only its diode 81 is connected to ground potential. Depression of key 14 will disconnect the diodes 79, 80, and 81 from ground potential applied to it, and allow negative potential to be applied to the conductors 77 and 82. The AND gate 78 is not enabled when its diode 75 is connected to ground potential. When a selected key 12 and both keys 13 and 14 are depressed, the diodes 73, 74, 75, 79, 80, and 81 are all disconnected from ground potential, thereby impressing negative potential on the conductors 76 and 77. Also, the AND gate 78 is enabled, thereby turning a transistor Q3 on, but the conductor 82 is held at ground potential by virtue of the transistor Q3 being on.

The conductor 76 is connected to the trigger of each pedestal gate 83 and 84; triggering of the pedestal gates 83 and 84 will change the states of the transistors Q1 and Q2 of the memory device 20. The conductor 77 is connected to the trigger of a pedestal gate 85; triggering the pedestal gate 85 will cause the transistor Q2 of the memory device 22 to turn off. The conductor 82 is connected to the trigger of each pedestal gate 86 and 87; triggering of the pedestal gates 86 and 87 will change the states of the transistors Q1 and Q2 of the memory device 23.

When a selected key 12 and the key 13 are depressed, predetermined ones of the switches 36 through 43 are closed and the switch 44 is also closed. The memory devices 16 through 23 are set to initial condition by the delay 55. Thereafter, a pulse from the delay 52 enables the pedestal gate or gates 49 associated with the predetermined ones of the switches 36 through 43 to change the states of corresponding ones of the memory devices 16 through 23. At the end of 1 milli-second after the predetermined pedestal gates 49 are triggered, the delay 66 applies negative potential to the diodes 68, 69, and 70. As the key 13 has been depressed, diodes 73, 74, and 75 are no longer connected to ground potential. Thus, negative potential is applied to the conductors 76 and 82 thereby changing the states of the transistors Q1 and Q2 of the respective memory devices 20 and 23.

The output of the delay 66 is connected to the input of a 1 milli-second delay 88. The operation of the delay 88 is initiated by the pulse applied to the conductor 67 by the delay 66. At 1 milli-second after operation of the delay 88 is initiated, a pulse is applied to a conductor 89 which connects the delay 88 and a pedestal gate 90, thereby triggering the pedestal gate 90. An output pulse from the pedestal gate 90 changes the state of a two-state electronic memory device 91, causing a pulse in a conductor 92 to indicate to the receiver 24 that the output conductors 50 and 51 contain a data signal for it to receive. When the receiver 24 has accepted the data signal, the receiver 24 resets the memory device 91 via a conductor 93 and triggers a pedestal gate 94 via conductors 95 and 96 to reset the keyboard lock device 58 to unlock the keyboard by operating the keyboard lock solenoid 59.

Assume now that a selected key 12 is depressed together with the key 14. The memory devices 16 through 23 will be driven to their initial states and thereafter the memory devices, corresponding to predetermined ones of the switches 36 through 43 will be set, in the manner previously described in detail. As negative potential is applied to the diode 69 and the diode 79 is disconnected from ground potential, and negative potential is applied to the diode 70 and the diode 80 is disconnected from ground potential, respective conductors 77 and 82 have negative potential applied to them, turning the transistor Q2 of the memory device 22 off and reversing the states of the transistors Q1 and Q2 of the memory device 23.

Assume now that both keys 13 and 14 had been depressed together with the selected key 12. The AND gate 78 will be enabled because the pair of diodes 75 and 81 is disconnected from ground potential, thereby turning the transistor Q3 on. As the transistor Q3 is now on, it will hold the conductor 82 at ground potential, thereby preventing the pair of diodes 70 and 74 from causing the conductor 82 to be at negative potential; consequently, the pedestal gates 86 and 87 are not operated. However, pairs of diodes 68 and 73, and 69 and 79, cause negative potential to be applied to the respective conductors 76 and 77, thereby reversing the states of the memory device 20 and causing the transistor Q2 of the memory device 22 to turn off.

Assuming a signal is to be repeated, with a key 12 being depressed, or with a key 12 being depressed together with one or both key 13 and 14, the switch element 64 of the switch 61 is manually depressed, thereby breaking the circuit to the keyboard lock solenoid 59 to unlock the keyboard. When a signal on the conductor 93 indicates that the receiver 24 is ready to receive data and the switch element 64 is in the depressed position (FIGURE 1) of the switch, a pedestal gate 97 will be triggered to initiate operation of the delay 52. The delay 52 will initiate setting and resetting of predetermined ones of the memory devices 16 through 23 in the manner described above. So long as element 64 is in the depressed position, the pedestal gate 97 will initiate the operation of the delay 52 each time a signal is applied to the conductor 93 by the receiver 24.

The code bar 33 is notched so that the number of similar potential data bits, for example, mark and parity bits, of the successive signals to be generated is always the same when only a key 12 is depressed. The parity of the generated signals is, therefore, always the same, namely, even or always odd. When the key 13 is depressed together with a key 12, the parity, that is, the number of similar potential bits, is not changed because the states of both memory devices 20 and 23 are reversed. Similarly, operation of the key 12 and the key 14 will cause the trannsistor Q2 of the memory device 22 to turn off and will reverse the states of the memory device 23. For signal keys 12 with which the key 14 is to be used, the code bar 32 which operates the switch 42 is depressed each time any such signal key 12 is depressed. Closing of the switch 42 turns the transistor Q1 off, and if the key 14 is also depressed, the action of the pedestal gate 85 turns the transistor Q2 off. Thus the parity of the generated signal remains the same even though keys 12 and 14 are depressed. Depression of a key 12 and both keys 13 and 14 will reverse the states of the memory device 20 and will turn off the transistor Q2 of the memory device 22. The memory device 20, 22 and 23 comprise a group of three memory devices. When the key 13 or the key 14 or both are depressed, together with a key 12, there will always be a pair of memory devices of the group of three memory devices which is operated.

In using the apparatus 10, to insure that the keys 13 and/or 14 are effective for their intended purposes, the key 13, the key 14, or both, as required, should be depressed slightly before the selected approprite key 12 is depressed. Depression of the key or keys 13 and 14 after the negative pulse has been applied to the conductor 67 of the delay 66, will result in only the selected key 12 being operative to control predetermined memory devices 16 through 23, but the conductors 76, 77 and 82 will not have negative potential applied to them to effect change of state of the respective memory devices 20, 22, and 23.

Diodes 98 and 99 allow the capacitors (not shown) in the respective pedestal gates 83 and 84, and 86 and 87, to charge when the keys 12 and 13 are depressed, diodes 100 and 101 allow the capacitors (not shown) in the respective pedestal gates 85, and 86 and 87, to charge when the keys 12 and 14 are depressed, and diodes 98 and 100 allow the capacitors (not shown) in the respective pedestal gates 83 and 84, and 85, to charge when the keys 12, 13, and 14 are depressed. Diodes 98, 99, 100, and 101 all have the same effect of preventing the associated pedestal gates from being triggered before the respective diodes 68, 70, 69, 70 have ground potential applied to them via the conductor 67. An exclusive OR gate 102 is formed by the arrangement depicted in FIGURE 1. The exclusive OR gate 102 includes diodes 80, 101, 74, 99, and AND gate 78, the transistor Q3, their connections to each other and to voltage sources. The exclusive OR gate 102 will effect application of negative potential to the conductor 82 when either key 13 or the key 14 is depressed, but not when both the keys 13 and 14 are depressed, assuming a key 12 has been depressed.

Referring to FIGURE 2, the waveform identified as "Cond. 47" indicates the condition of the conductor 47 when its associated switch (any of the switches 36 through 43) is closed. The waveform identified as Cond. 44′ indicates the voltage changes on conductor 44′ when the switch 44 is closed. The remaining waveforms indicate the voltage changes on the conductors 56, 65, 57, 50, 67, 89, and 92 which occur in response to the operation of the delay 52.

As seen in FIGURE 5 the key 12*a* is used to generate only one signal, each key 12*b*, 12*c*, and 12*d* is used to generate either one of two signals, and the key 12*e* can be used to generate any one of four signals. The keys 13 and 14 are not usable in conjunction with the key 12*a*, and the key 14 is not usable in conjunction with the keys 12*b*, 12*c*, and 12*d*. Assume that they 12*e* (FIGURE 5) is depressed. The data signal generated by the apparatus 10 will be composed of data bits indicative of the symbol signal L. The bits can be indicated as "0" and "1" to indicate differences in potential. For example, a "0" can represent ground potential and a "1" can represent negative potential. The letter L has seven bits in a predetermined combination, 0, 0, 1, 1, 0, 0 and 1. Assuming it is desired that parity of the generated signal be "even" then the eight bit would be a "1." Depression of the key 12*e* will result in the closure of the switches 38, 39, 42, 43, and 44 by respective code bars 28, 29, 32, 33, and 34. As a gap initially exists between the code bar 34 and the bar 25 associated with the key 12*e*, the switch 44 closes subsequent in time to the closure of the switches 38 39, 42, and 43. Closure of the switches 38, 39, 42, and 43 causes ground potential to be placed on the respective conductors 47 and one input of respective pedestal gates 49. Closure of the switch 44 initiates the operation of the 25 milli-second time delay 52. Initiation of the operation of the delay 52, causes the delay 55 to turn all the transistors Q1 on, and also causes triggering of the pedestal gate 60 and energization of the keyboard lock solenoid 59. Energization of the solenoid 59 will move a bar 59′ into the path of the lug 12′ of each key 12, thereby locking the keyboard. Twenty-five milliseconds after the operation of the delay 52 is initiated, the operation of the 1 milli-second delay 66 is initiated by a pulse on the conductor 65. Also, the conductor 65 carries a pulse to all the pedestal gates 49, but only the pedestal gates 49 associated with the switches 38, 39, 42, and 43 will be triggered. As a consequence, the states of the memory devices 18, 19, 22, and 23 will be changed so that their transistors Q2 will now be on. Thus, the conductors 51 connected to respective memory devices 16 through 23 will be at 0, 0, 1, 1, 0, 0, 1, and 1 states. One milli-second after the operation of the delay 66 was initiated a pulse was applied to the conductor was applied to the conductor 67 and to the input of the 1 milli-second delay 88; application of this pulse to the conductor 67 did not affect the conductors 76, 77, and 82, as all the diodes 73, 74, 79, 80, and 81 had ground potential applied to them. However 1 milli-second after the operation of the delay 88 is initiated, the delay 88 places negative potential of the conductor 89 to trigger the pedestal gate 90, thereby changing the state of the memory device 91; consequently, the receiver 24 is signalled via the conductor 92 that there is a data signal waiting for the receiver 24 to accept. If the key 13 had been depressed together with the key 12*e*, one milli-second after the pedestal gates 49 associated with the memory devices 18, 19, 22, and 23 were triggered, the delay 66 would effect application of negative potential to the conductors 76 and 82, thereby changing the states of memory devices 20 and 23; the conductors 51 thus provide data bit outputs indicative of the symbol ~. One milli-second after the delay 66 applies a pulse to the conductor 67, the delay 88 applies a pulse to the conductor 89, thereby operating the memory device 91 to signal the receiver 24 that a data signal is waiting ready for it to accept. If the key 14 had been depressed together with the key 12*e*, one milli-second after the pedestal gates 49 associated with the memory devices 18, 19, 22, and 23 were triggered, the delay 66 would effect application of negative potential to the conductors 77 and 82. The negative pulse on the conductor 77 turns off the transistor Q2 of the memory device 22. The negative pulse on the conductor 82 changes the state of the memory device 23, specifically the transistor Q1 is turned on and the transistor Q2 is turned off. The device 91 is operated by a negative pulse on the conductor 89 as indicated above. The signal appearing on the conductors 51 corresponds to the machine function FF (form feed). Assuming both keys 13 and 14 are depressed together with the key 12*e*, one milli-second after the pedestal gates 49 associated with the memory devices 18, 19, 22, and 23 are triggered, the pulse in the conductor 67 effects application of negative potential to the conductors 76 and 77, turning on the transistor Q2 of the memory device 20 and turning off the transistor Q2 of the memory device 22. The signal appearing on the conductors 51 corresponds to the machine function FS (form separator). The memory device 91 will be operated by a pulse on the conductor 89, as indicated above.

I claim:

1. Apparatus for generating binary code data signals, each signal being composed of a predetermined combination of binary data bits, said apparatus comprising: signal output means including a set of memory devices, a keyboard having a plurality of first keys fewer in number than the maximum number of different signals capable of being provided by said output means and having a second key, a plurality of first switch means and at least one second switch means for operating said memory devices, each first key being operable to operate predetermined ones of said first switch means to provide a signal, and means responsive to operation of a selected first key and said second key for sequentially enabling said first switch means and thereafter enabling said second switch means to operate said memory devices to provide a signal distinct from the signal which would be provided by operating only the selected first key.

2. Generating apparatus as defined in claim 1, said keyboard having a third key, at least one third switch means for operating said output means, said third key being operable together with a selected one of said first keys and with said second key for operating said third switch means to provide a signal distinct from the signal which would be provided by operating only the selected first key and distinct from the signal which would be provided by operating only the selected first key and said second key.

3. Generating apparatus as defined in claim 1, said keyboard having a third key, at least one third switch means for operating said output means, gating circuit means connecting said second switch means and said output means, and gating circuit means connecting said third switch means and said output means.

4. Generating apparatus as defined in claim 1, each first switch means being operatively connected to a respective one of said memory devices, said second switch means being operatively connected to at least one of said memory devices.

5. Generating apparatus as defined in claim 1, said memory devices being of the two-state type and being equal in number to the number of said first switch means, means for initially setting said memory devices to initial states, each first switch means being operatively connected to a respective one of said two-state devices and being operable to change the state of its respective two-state device, said second switch means being operatively connected to at least one of said two-state devices and being operable to change the state of each respective two-state device.

6. Generating apparatus as defined in claim 1, including means responsive to the operation of any one of said first keys for setting said output means to an initial state condition, time delay means for enabling said first switch means to operate said output means a predetermined time after operation of said first switch means, and time delay means for enabling said second switch means to operate said output means a predetermined time after operation of said second switch means and only after said first switch means have operated said output means.

7. Generating apparatus as defined in claim 1, said memory devices being of the two-state type, said sequential enabling means including first gating means operatively connected to each two-state device, second gating means operatively connected to at least one of said two-state devices and timing means connected to all of said first and second gating means, each first switch means being operatively connected to a respective one of said first gating means, said second switch means being operatively connected to said second gating means, said timing means providing for sequential operation of said first and second gating means.

8. Generating apparatus as defined in claim 1, including means for signaling a receiver when said output means has a data signal for it to receive.

9. Generating means as defined in claim 1, including means responsive to the operation of any one of said first keys for locking said keyboard to prevent operation of any other first key, and means for operating said locking means to unlock said keyboard when the signal has been accepted by receiver.

10. Generating apparatus as defined in claim 1, wherein said memory devices include bistable multivibrators each providing a data bit output.

11. Generating apparatus as defined in claim 1, said sequential enabling means including time delay means for enabling said first switch means to operate said output means a predetermined time after operation of said first switch means.

12. Generating apparatus as defined in claim 1, said sequential enabling means including first time delay means responsive to the operation of any one of said first keys, second time delay means operable by said first time delay means for initially setting said output means to initial condition, third time delay means operable by said first time delay means for enabling said first and second switch means to operate said output means.

13. Generating apparatus as defined in claim 1, including means connecting said second switch means and a pair of said memory devices for maintaining the same parity for each output signal.

14. Apparatus for generating binary code data signals, each signal being composed of a predetermined combination of data bits, said apparatus comprising: memory means for providing said signals, said memory means including a set of two-state, electronic memory devices, each memory device providings a data bit output corresponding to the state of that memory device, means for initially setting said set of memory devices to an initial condition, and operating means for thereafter setting predetermined ones of said set of memory devices to different states to provide selected combinations of data bit outputs, said operating means including a plurality of first selecting means fewer in number than the maximum number of combinations of data bit outputs of said set of memory devices, each first selecting means having means for changing the state of predetermined ones of said memory devices to provide a predetermined signal, said operating means further including a second selecting means operable together with one of said first selecting means for changing the state of at least one of said memory devices so that said set of memory devices provides a different predetermined signal.

15. Generating apparatus as defined in claim 14, each memory device including a bi-stable multivibrator, said operating means including a first switch operatively connected to each multivibrator and a second switch operatively connected to at least one of said multivibrators, said first selecting means including a plurality of keys each of which operates predetermined ones of said first switches to change the state of each respective multivibrator to provide a predetermined data bit output, said second selecting means including a key for operating said second switch to change the data bit output of the respective multivibrator.

16. Apparatus for generating data signals, each signal being composed of a predetermined combination of data bits, said apparatus comprising: a keyboard having a plurality of first keys, a second key and a third key, a plurality of first switches, a second switch and a third switch, means operable by any one of said first keys for operating predetermined ones of said first switches, a plurality of two-state memory devices equal in number to the number of said first switches, an output conductor connected to each memory device, a gating circuit electrically connecting each first switch to a respective one of said memory devices; gating circuit means electrically connecting said second and third switches to a group of three of said memory devices, said gating circuit means including means responsive to operation of a selected first key together with said second key for operating one pair of said group of memory devices, means responsive to operation of a selected first key together with said third key for operating another pair of said group of memory devices, and means responsive to operation of a selected first key together with said second and third keys for operating yet another pair of said group of memory devices; means responsive to any one of said first keys for initially setting said memory devices of initial condition, and means responsive to operation of any one of said first keys and operatively connected to said gating circuits and to said gating circuit means for sequentially enabling operation of said memory devices by a selected first switch and one or both of said second and third switches.

17. Apparatus for generating binary code data signals, each signal being composed of a predetermined combination of data bits, said apparatus comprising: signal output means, a keyboard having a plurality of first keys fewer in number than the maximum number of different signals capable of being provided by said output means and having a second key and a third key, and means for operating said output means to provide a first signal when a selected one of said first keys is depressed, for operating said output means to provide a second signal when the selected first key and said second key are depressed, for operating said output means to provide a third signal when the selected first key and said third key are depressed, and for operating said output means to provide a fourth signal when the selected first key and said second and third keys are depressed.

References Cited

UNITED STATES PATENTS

| | | |
|---|---|---|
| 2,192,594 | 3/1940 | Brand et al. |
| 3,225,883 | 12/1965 | Ayres. |
| 3,305,062 | 2/1967 | Kittredge. |

THOMAS A. ROBINSON, Primary Examiner

U.S. Cl. X.R.

178—17, 30; 197—11; 235—145

UNITED STATES PATENT OFFICE
CERTIFICATE OF CORRECTION

Patent No. 3,466,647 September 9, 196

John Guzak, Jr.

It is certified that error appears in the above identified patent and that said Letters Patent are hereby corrected as shown below:

In the heading to the printed specification, line 3, "Waukegan, Ill." should read -- Arlington Heights, Ill. --. Column 1, line 15, "eletcronic" should read -- electronic --. Column 3, line 22, "mill-second" should read -- milli-second - line 66, "K2" should read -- Q2 --. Column 4, line 17, "negtai should read -- negative --. Column 5, line 52, "trannsis" shou read -- transis --; line 73, "approprite" should read -- appropriate --. Column 6, line 1, "of" should read -- by --; l 18, ", 70" should read -- , and 70 --; line 22, "and" should r -- the --; line 25, "either key" should read -- either the key line 31, "any of the" should read -- any one of the --; line 3 after "5" and before "the" insert a comma; line 53, after "ev and before "then" insert a comma; line 59, after "38" and befo "39" insert a comma. Column 7, line 6, cancel "was applied to conductor"; line 24, after "~" insert a period. Column 8, li 56, after "by" and before "receiver" insert -- a --. Column 9, line 8, "providings" should read -- providing --.

Signed and sealed this 12th day of May 1970.

(SEAL)
Attest:

EDWARD M.FLETCHER,JR.
Attesting Officer

WILLIAM E. SCHUYLER, J
Commissioner of Patent